United States Patent
Iwamoto

(10) Patent No.: US 11,205,089 B2
(45) Date of Patent: Dec. 21, 2021

(54) OBJECT IDENTIFICATION DEVICE, OBJECT IDENTIFICATION METHOD, AND RECORDING MEDIUM

(71) Applicant: NEC Corporation, Tokyo (JP)

(72) Inventor: Kota Iwamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 8 days.

(21) Appl. No.: 16/623,987

(22) PCT Filed: Jul. 7, 2017

(86) PCT No.: PCT/JP2017/024923
§ 371 (c)(1),
(2) Date: Dec. 18, 2019

(87) PCT Pub. No.: WO2019/008734
PCT Pub. Date: Jan. 10, 2019

(65) Prior Publication Data
US 2020/0143196 A1 May 7, 2020

(51) Int. Cl.
*G06K 9/62* (2006.01)
*G06T 7/73* (2017.01)

(52) U.S. Cl.
CPC ......... *G06K 9/6202* (2013.01); *G06K 9/6215* (2013.01); *G06T 7/74* (2017.01)

(58) Field of Classification Search
CPC .... G06K 9/00; G06K 9/00671; G06K 9/6202; G06K 9/6211; G06K 9/6215; G06T 7/74
See application file for complete search history.

(56) References Cited

U.S. PATENT DOCUMENTS

| 7,280,687 | B2 * | 10/2007 | Ban | G06T 7/75 345/419 |
| 8,224,029 | B2 * | 7/2012 | Saptharishi | G06K 9/00718 382/103 |
| 8,611,673 | B2 * | 12/2013 | Aarabi | G06F 16/5854 382/209 |

(Continued)

FOREIGN PATENT DOCUMENTS

| JP | 2001-014465 A | 1/2001 |
| JP | 2006-228199 A | 8/2006 |

(Continued)

OTHER PUBLICATIONS

International Search Report corresponding to PCT/JP2017/024923 dated Sep. 26, 2017 (2 pages).

(Continued)

*Primary Examiner* — Ian L Lemieux

(57) ABSTRACT

An object identification device includes: at least one memory configured to store instructions; and at least one processor configured to execute the instructions to: compare a captured image against a plurality of identification images for identifying objects; and determine, after the comparison result indicates that a plurality of objects are included in the captured image, whether or not the plurality of objects are same objects, based on a first parameter indicating a geometric relation between the identification images and a second parameter indicating a geometric relation between identification image related to each identified object and the captured image.

13 Claims, 14 Drawing Sheets

(56) References Cited

U.S. PATENT DOCUMENTS

| | | | | |
|---|---|---|---|---|
| 9,171,195 B1* | 10/2015 | Rybakov | ............... | G06K 9/6807 |
| 9,449,258 B1* | 9/2016 | Palacio | .................. | H04N 5/247 |
| 10,902,263 B1* | 1/2021 | Angel | .................... | G01C 21/20 |
| 2003/0113017 A1* | 6/2003 | Thomas | .................... | G06K 9/46 |
| | | | | 382/181 |
| 2006/0177110 A1 | 8/2006 | Imagawa et al. | | |
| 2007/0196019 A1 | 8/2007 | Yamaguchi | | |
| 2008/0089590 A1* | 4/2008 | Isomura | ............. | H04N 1/00193 |
| | | | | 382/217 |
| 2012/0002881 A1* | 1/2012 | Maeda | ............... | G06K 9/00677 |
| | | | | 382/195 |
| 2012/0128241 A1* | 5/2012 | Jung | ...................... | H04N 21/84 |
| | | | | 382/165 |
| 2013/0058530 A1 | 3/2013 | Naito et al. | | |
| 2016/0171336 A1* | 6/2016 | Schwartz | ................. | G06K 9/18 |
| | | | | 382/173 |
| 2016/0364883 A1* | 12/2016 | Shiiyama | ............. | G06K 9/4642 |
| 2019/0354923 A1* | 11/2019 | Taira | ....................... | B60R 11/04 |
| 2020/0193552 A1* | 6/2020 | Turkelson | ................ | G06N 3/08 |

FOREIGN PATENT DOCUMENTS

| | | |
|---|---|---|
| JP | 2007-219765 A | 8/2007 |
| JP | 2007-226512 A | 9/2007 |
| JP | 2013-054673 A | 3/2013 |

OTHER PUBLICATIONS

Written Opinion corresponding to PCT/JP2017/024923 dated Sep. 26, 2017 (4 pages).

* cited by examiner

Fig.4
| IMAGE NUMBER | ARTICLE NAME | DATABASE IMAGE |
|---|---|---|
| 401A | AAA | 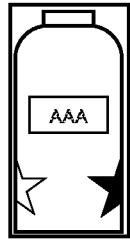 44A |
| 401B | AAA | 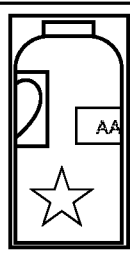 44B |
| 401C | AAA |  44C |
| 401D | AAA | 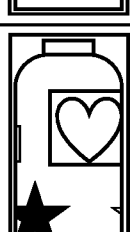 44D |
| 401E | AAA | 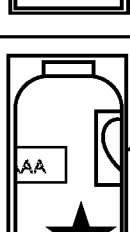 44E |
| ... | ... | ... |

| ARTICLE NAME | QUANTITY |
|---|---|
| AAA | 1 |
| ... | ... |

OBJECT IDENTIFICATION DEVICE, OBJECT IDENTIFICATION METHOD, AND RECORDING MEDIUM

CROSS REFERENCE TO RELATED APPLICATIONS

This application is a national stage application of International Application No. PCT/JP2017/024923 entitled "Object Identification Device, Object Identification Method, Calculating Device, System and Recording Medium" filed on Jul. 7, 2017, the disclosure of which is hereby incorporated by reference in its entirety.

TECHNICAL FIELD

The present disclosure relates to an object identification device, an object identification method, a calculation device, a system, and a recording medium.

BACKGROUND ART

As a method of enhancing recognition precision, increasing an amount of information in a database used for recognition is disclosed (for example, PTL 1). Further, a technology of estimating a position and an attitude of a three-dimensional object, based on a two-dimensional image, by use of a database generated by use of images in which an object for reference is captured from a plurality of different viewpoints is disclosed (for example, PTL 2).

CITATION LIST

Patent Literature

PTL 1: Japanese Unexamined Patent Application Publication No. 2001-014465
PTL 2: Japanese Unexamined Patent Application Publication No. 2007-219765

SUMMARY OF INVENTION

Technical Problem

In object identification (subject identification) using a local feature value, for example, a method of comparing images (database images) in which images of an object are captured from various directions, the images being registered in a database, against a query image including an object to be identified and identifying which object exists at which position in the query image may be considered.

Thus, when a plurality of database images used for identification are registered in a database for one object, a plurality of database images may be output for a query image as an identification result. Since the identification result includes a plurality of database images, a number of identified objects may not be accurately grasped.

The present disclosure has been made in view of the aforementioned problem, and an object of the present disclosure is to provide a technology capable of precisely identifying a number of objects to be identified.

Solution to Problem

An object identification device according to an aspect of the present disclosure includes: at least one memory configured to store instructions; and at least one processor configured to execute the instructions to: compare a captured image against a plurality of identification images for identifying objects; and determine, after the comparison result indicates that a plurality of objects are included in the captured image, whether or not the plurality of objects are same objects, based on a first parameter indicating a geometric relation between the identification images and a second parameter indicating a geometric relation between the identification image related to each identified object and the captured image.

Further, an object identification method according to an aspect of the present disclosure includes: comparing a captured image against a plurality of images for identification for identifying objects; and, when the comparison result indicates that a plurality of objects are included in the captured image, determining whether or not the plurality of objects are same objects, based on a first parameter indicating a geometric relation between the images for identification and a second parameter indicating a geometric relation between the image for identification related to each identified object and the captured image.

Further, a calculation device according to an aspect of the present disclosure includes: at least one memory configured to store instructions; and at least one processor configured to execute the instructions to: extract, from each of a plurality of identification images for identifying objects, feature information indicating a feature of the object; and calculate, after a plurality of objects are identified in a captured image by a comparison using the identification image, a first parameter used along with a second parameter to determine when determining whether or not the plurality of objects are same objects, based on the extracted feature information, the first parameter indicating a geometric relation between the plurality of identification images, and the second parameter indicating a geometric relation between the identification image related to each identified object and the captured image.

Further, a system including the aforementioned object identification device and calculation device also falls under the category of the present disclosure.

A computer program providing each of the aforementioned devices or the aforementioned method by a computer and a computer readable non-transitory recording medium storing the computer program also fall under the category of the present disclosure.

Advantageous Effects of Invention

The present disclosure precisely identifies a number of objects to be identified.

BRIEF DESCRIPTION OF DRAWINGS

FIG. 4 is a diagram illustrating an example of image information including database images stored in an image storage unit.

EXAMPLE EMBODIMENT

First Example Embodiment

Figure 1:
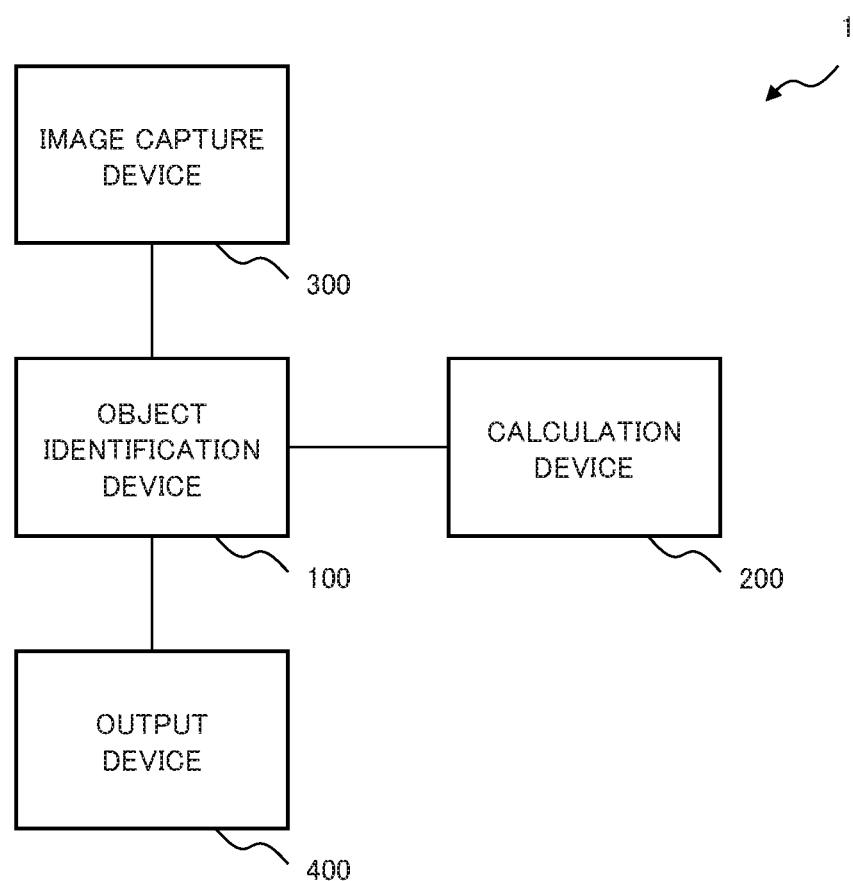
FIG. 1 is a diagram illustrating an example of an overall configuration of a system according to a first example embodiment.

A first example embodiment of the present disclosure will be described with reference to drawings. FIG. 1 is a diagram illustrating an example of an overall configuration of a system 1 according to the present example embodiment. The system 1 illustrated in FIG. 1 includes an object identification device 100, a calculation device 200, an image capture device 300, and an output device 400. FIG. 1 illustrates a configuration characteristic of the present disclosure, and it goes without saying that the system 1 may include a device not illustrated in FIG. 1. Further, the devices illustrated in FIG. 1 may be configured to be combined with one another. For example, the object identification device 100 and the calculation device 200 may be integrated with each another, and the object identification device 100 and the image capture device 300 may be integrated with each another.

The object identification device 100 is mutually and communicably connected to the calculation device 200, the image capture device 300, and the output device 400. Communication unit between the devices may be either of wired or wireless communication, or may be communication through any of a mobile communication network, a public network, a local area network (LAN), and a wide area network (WAN). Thus, various methods may be considered as the communication method between the devices.

The image capture device 300 captures an image including an object being an image capture target. For example, the image capture device 300 is provided by a camera including a lens and an imaging element. For example, the image capture device 300 is provided by a digital camera or a web camera. The image capture device 300 supplies a captured image to the object identification device 100. The image capture device 300 may store a captured image inside the image capture device 300 or a storage device different from the object identification device 100. In this case, the object identification device 100 may acquire a captured image from a location where the captured image is stored.

The output device 400 performs output based on a control signal from the object identification device 100. For example, the output device 400 may be a display device such as a display or a terminal device including a display. Further, without being limited to the above, the output device 400 may be a speaker, a printer, or a device outputting information included in a received signal as a file.

Figure 2:
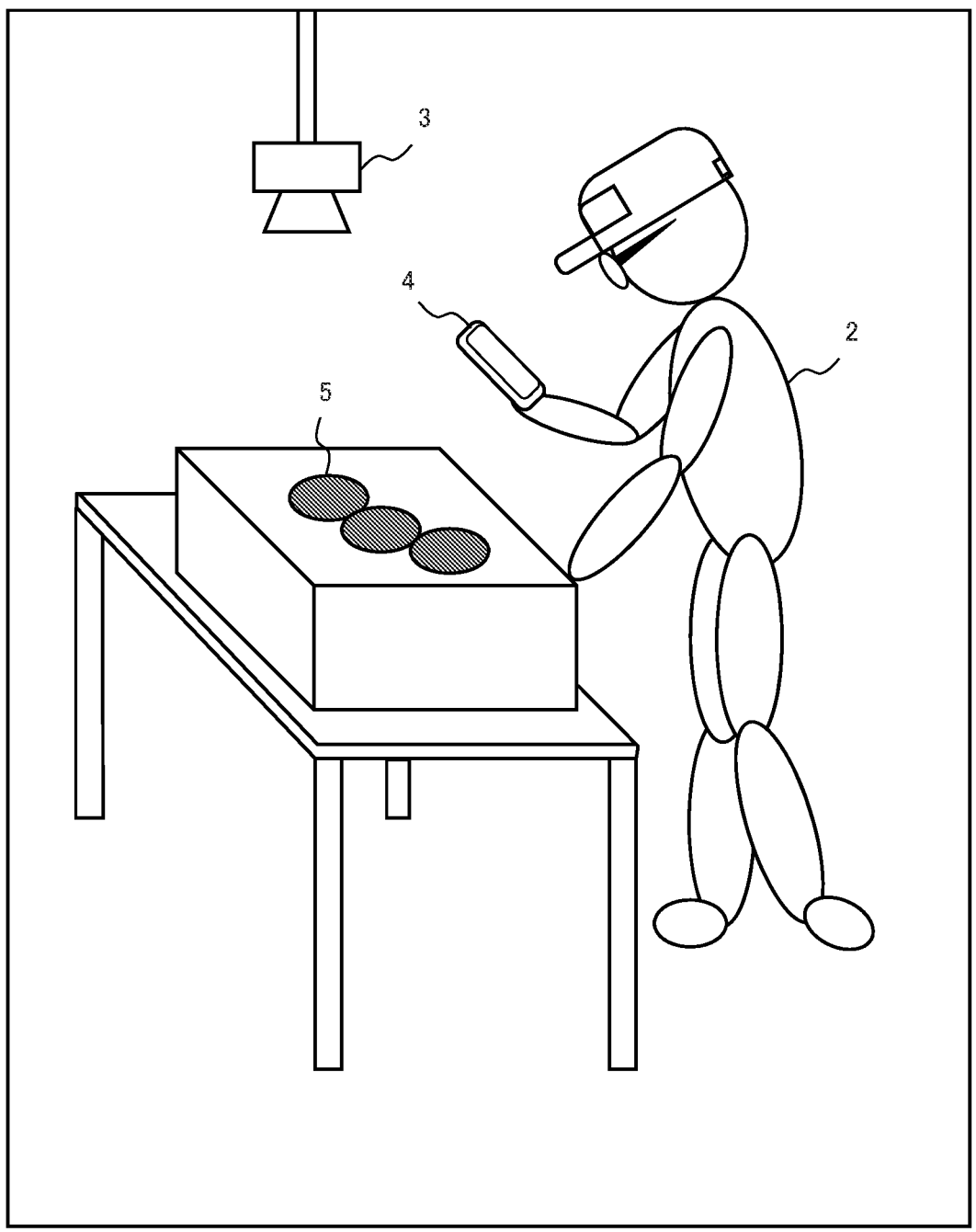
FIG. 2 is a diagram for illustrating an example of a use scene in which the system according to the first example embodiment is used.

FIG. 2 is a diagram for illustrating an example of a use scene in which the system 1 according to the present example embodiment is used. In FIG. 2, a camera 3 installed at a position allowing image capture of articles 5, as an example of objects, packed in a predetermined container is illustrated as an example of the image capture device 300. Further, in FIG. 2, a mobile terminal 4 is illustrated as an example of the output device 400.

A captured image including the articles 5 captured by the camera 3 is transmitted to the object identification device 100. The object identification device 100 determines a number of the articles 5, based on an identification result of the articles 5 and a parameter calculated by the calculation device 200. Then, the object identification device 100 outputs the determination result to the mobile terminal 4. Consequently, an operator 2 can check the determination result displayed on a screen on the mobile terminal 4.

Figure 3:
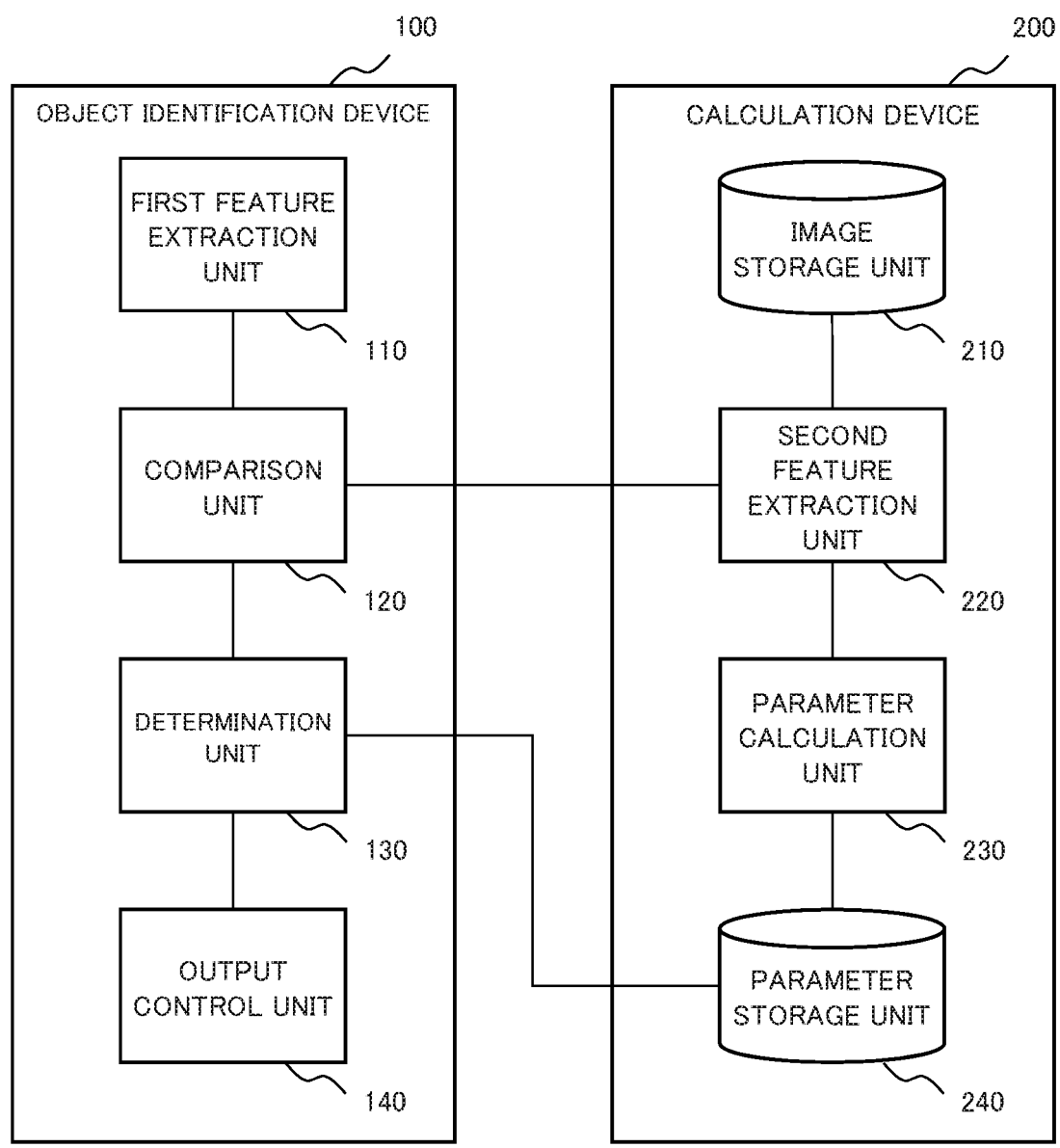
FIG. 3 is a functional block diagram illustrating an example of functional configurations of an object identification device and a calculation device that are included in the system according to the first example embodiment.

Next, configurations of the object identification device 100 and the calculation device 200 that are included in the system 1 will be described with reference to FIG. 3. The object identification device 100 receives a captured image captured by the image capture device 300, compares objects included in the captured image, and determines a number of the objects. The object identification device 100 includes a first feature extraction unit 110, a comparison unit 120, a determination unit 130, and an output control unit 140.

The calculation device 200 stores an image for identification (also referred to as a database image) for identifying an object. The image is used when the object identification device 100 makes a comparison on an object included in the captured image. Further, the calculation device 200 calculates a parameter used when the object identification device 100 determines a number of objects. The calculation device 200 includes an image storage unit 210, a second feature extraction unit 220, a parameter calculation unit 230, and a parameter storage unit 240.

First, each unit in the calculation device 200 will be described. The image storage unit 210 stores a database image for identifying an object. A database image is used when an object is compared against the captured image. For each object, the image storage unit 210 according to the present example embodiment stores, as database images, images of the object which are captured at a plurality of angles. Examples of database images stored by the image storage unit 210 are illustrated in FIG. 4. FIG. 4 is a diagram illustrating an example of image information 41 including database images stored in the image storage unit 210. As illustrated in FIG. 4, the image information 41 includes an image number 42, an article name 43, and a database image 44. An image number 42 is an identifier for identifying a database image 44. An article name 43 is a name of an article represented by a database image 44. A database image 44 is a captured image in which an image of an article indicated by an article name 43 is captured.

As illustrated in FIG. 4, the image information 41 includes database images 44 being captured images in which images of an article with an article name 43 "AAA" are captured from a plurality of directions. For example, a database image 44 with an image number 42 "401A" (database image 44A) is a captured image in which an image of the article is captured from a first direction in which an entire label including characters "AAA" is included, and a database image 44 with an image number 42 "401B" (database image 44B) is a captured image in which an image of the same article is captured from a second direction different from the first direction. Thus, it is assumed in the present example embodiment that the image information 41 includes, as database images 44, captured images in which images of one article are captured from a plurality of directions.

A database image 44 may be an image generated as an image for comparing instead of an actually captured image. Further, a database image 44 may be an image captured by the image capture device 300 or an image acquired by another method. Further, the image storage unit 210 may be provided by a storage device separate from the calculation device 200.

The second feature extraction unit 220 extracts a feature value from each database image 44 stored in the image storage unit 210 and extracts (detects) a feature point having the feature value. Information related to a feature value and a feature point that are extracted by the second feature extraction unit 220 is hereinafter referred to as feature information. The second feature extraction unit 220 may extract feature information by any method, and the method is not particularly limited. The second feature extraction unit 220 may extract feature information used when the object identification device 100 makes a comparison. The second feature extraction unit 220 stores the extracted feature information into the own unit or a storage unit such as the image storage unit 210, along with information (for example, an image number 42) indicating a database image 44 being an extraction source. The aforementioned image storage unit 210 may store the feature information extracted by the second feature extraction unit 220, in addition to or in place of a database image 44. Further, the second feature extraction unit 220 may extract a plurality of types of feature values as feature information. The second feature extraction unit 220 supplies the extracted feature information to the parameter calculation unit 230, along with information (for example, an image number 42) indicating a database image 44 being an extraction source.

Figure 5:
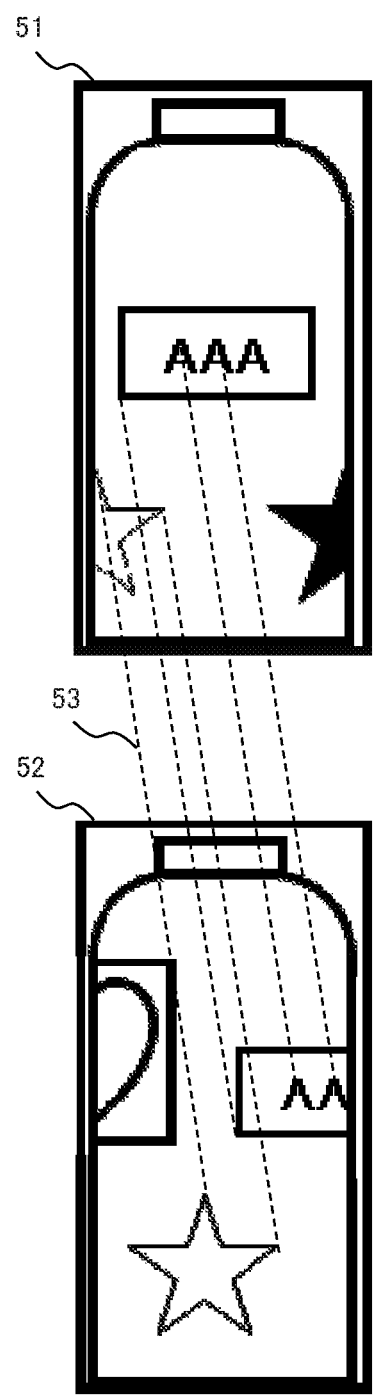
FIG. 5 is a diagram for illustrating parameter calculation by a parameter calculation unit.

The parameter calculation unit 230 calculates a parameter indicating a geometric relation between database images by use of feature information extracted by the second feature extraction unit 220. FIG. 5 is a diagram for illustrating parameter calculation by the parameter calculation unit 230.

A database image 51 illustrated in the upper part of FIG. 5 is the database image 44 with the image number 42 "401A" illustrated in FIG. 4. Further, a database image 52 illustrated in the lower part of FIG. 5 is the database image 44 with the image number 42 "401B" illustrated in FIG. 4. The parameter calculation unit 230 specifies feature points related between the database image, by use of feature information extracted from each of the database image 51 and the database image 52 by the second feature extraction unit 220. A broken line 53 in FIG. 5 is an example of a segment connecting related feature points between the database images. The parameter calculation unit 230 thus specifies related feature points and calculates a parameter indicating a geometric relation between the database images.

For example, when a parameter is assumed to be a homography matrix, the parameter calculation unit 230 calculates a homography matrix transforming coordinates on the database image 51 into coordinates on the database image 52. Further, the parameter calculation unit 230 also calculates a homography matrix transforming coordinates on the database image 52 into coordinates on the database image 51. Since the homography matrix transforming coordinates on the database image 52 into coordinates on the database image 51 is an inverse matrix of the homography matrix transforming coordinates on the database image 51 into coordinates on the database image 52, either one may be calculated.

A parameter is assumed to be a homography matrix in the description of the present example embodiment but is not limited thereto, and may be a transformation factor used in an affine transformation or a parameter used in another transformation formula.

The parameter calculation unit 230 calculates a parameter for database images between which a geometric relation holds out of database images 44 stored in the image storage unit 210, by use of feature information extracted by the second feature extraction unit 220. Then, the parameter calculation unit 230 stores, into the parameter storage unit 240, information indicating each of the two database images being targets of the parameter calculation and the parameter in association with each other.

Figure 6:
FIG. 6 is a diagram illustrating an example of parameter information stored by a parameter storage unit.

The parameter storage unit 240 stores a parameter calculated by the parameter calculation unit 230, along with information indicating each of two database images being targets of parameter calculation. An example of parameter information including parameters stored in the parameter storage unit 240 is illustrated in FIG. 6. As illustrated in FIG. 6, the parameter storage unit 240 stores parameter information 61.

As illustrated in FIG. 6, the parameter information 61 includes a transformation source image number 62, a transformation destination image number 63, and a parameter 64. A transformation source image number 62 is an image number indicating a database image being a source of a geometric transformation, and a transformation destination image number 63 is an image number indicating a database image being a destination of a geometric transformation. For example, a parameter 64 in the first row in the parameter information 61 is a homography matrix in a case of transforming coordinates on a database image 44A being a database image 44 with an image number 42 "401A" into coordinates on a database image 44B being a database image 44 with an image number 42 "401B." For convenience of description, the parameter 64 in this case is hereinafter denoted as H[401A→401B].

Similarly, H[401A→401C] denotes a homography matrix in a case of transforming coordinates on the database image 44A with the image number 42 "401A" into coordinates on a database image 44C being a database image 44 with an image number 42 "401C" and is a parameter 64 included in the second row in FIG. 6.

Further, H[401B→401A] denotes a homography matrix in a case of transforming coordinates on the database image 44B with the image number 42 "401B" into coordinates on the database image 44A with the image number 42 "401A" and is an inverse matrix of H[401A→401B].

The parameter storage unit 240 may be provided by a storage device separate from the calculation device 200. Further, the parameter storage unit 240 may be integrally configured with the image storage unit 210. Further, the parameter storage unit 240 may be built into the object identification device 100.

Next, the object identification device 100 will be described. The first feature extraction unit 110 extracts a feature value from a captured image and extracts a feature point having the feature value. The first feature extraction unit 110 acquires a captured image from the image capture device 300 or a storage device storing the captured image. The first feature extraction unit 110 extracts feature information being information about a feature value and a feature point from the acquired captured image. The first feature extraction unit 110 may extract feature information by any method, and the method is not particularly limited. The first feature extraction unit 110 may extract feature information by a method similar to that by the second feature extraction unit 220. When the second feature extraction unit 220 extracts a plurality of types of feature values as feature information, the first feature extraction unit 110 may extract any of the type of feature value as feature information. Then, the first feature extraction unit 110 supplies the extracted feature information to the comparison unit 120, along with a captured image being an extraction source.

When a captured image acquired by the first feature extraction unit 110 is stored in a storage unit or the like in the object identification device 100, the first feature extraction unit 110 may supply extracted feature information to the comparison unit 120, along with information indicating a captured image being an extraction source.

The comparison unit 120 checks a captured image against a database image by use of feature information extracted by the first feature extraction unit 110 and feature information extracted by the second feature extraction unit 220. Then, the comparison unit 120 supplies the comparison result to the determination unit 130. For example, a comparison result includes a degree of similarity between a captured image and a database image 44, information indicating the database image 44, information indicating a related feature point, and a position of the feature point on the captured image but is not limited thereto. Further, for example, information indicating a database image 44 may be an image number 42 or other information. A method of comparing performed by the comparison unit 120 is not particularly limited, and any method may be employed.

The determination unit 130 refers to a comparison result and determines whether or not the comparison result indicates that a plurality of objects are included in a captured image. When determining that a plurality of objects are included in the captured image, based on the comparison result, the determination unit 130 determines whether or not the plurality of objects are the same objects, based on a parameter 64 (first parameter) stored in the parameter storage unit 240 and a second parameter indicating a geometric relation between a database image 44 and the captured image.

It is preferable that a second parameter indicating a geometric relation between a database image 44 and a captured image be the same type as the aforementioned parameter between database images 44. A second parameter is assumed to be a homography matrix in the description of the present example embodiment but is not limited thereto, and may be a transformation factor used in an affine transformation or a parameter used in another transformation formula.

First, the determination unit 130 receives a comparison result from the comparison unit 120. Then, the determination unit 130 refers to the comparison result and determines whether or not a plurality of objects are identified and also the plurality of identified objects indicate the same object. For example, whether the plurality of identified objects indicate the same object may be determined by determining whether or not the objects have the same name (for example, an article name). Then, when a plurality of objects having the same article name are identified, the determination unit 130 acquires, by use of information being included in the comparison result and indicating database images 44 related to the objects in the captured image, a parameter 64 between the database images 44 from the parameter storage unit 240. Then, the determination unit 130 determines whether or not the plurality of identified objects are the same objects, based on the acquired parameter 64 and a second parameter indicating a geometric relation between the database image 44 and the captured image.

Figure 7:
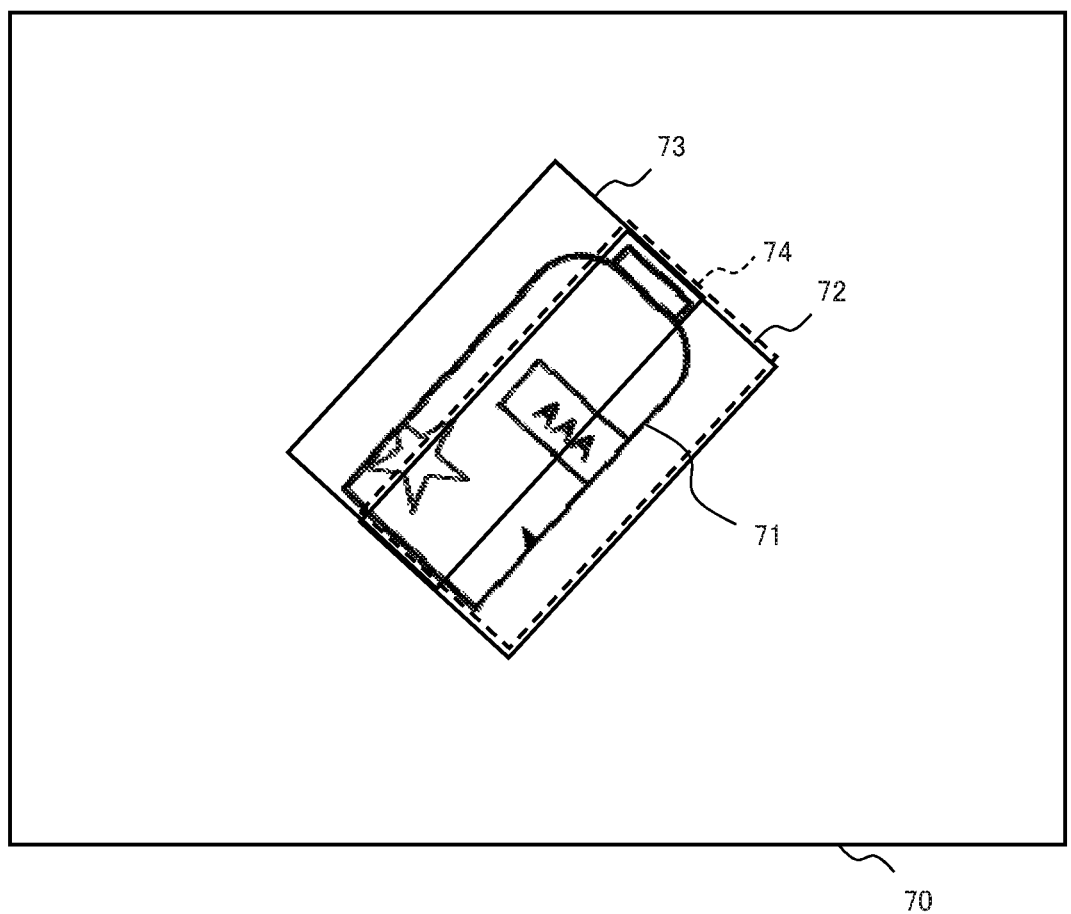
FIG. 7 is a diagram for illustrating determination processing performed by a determination unit.
Figures 8, 9:
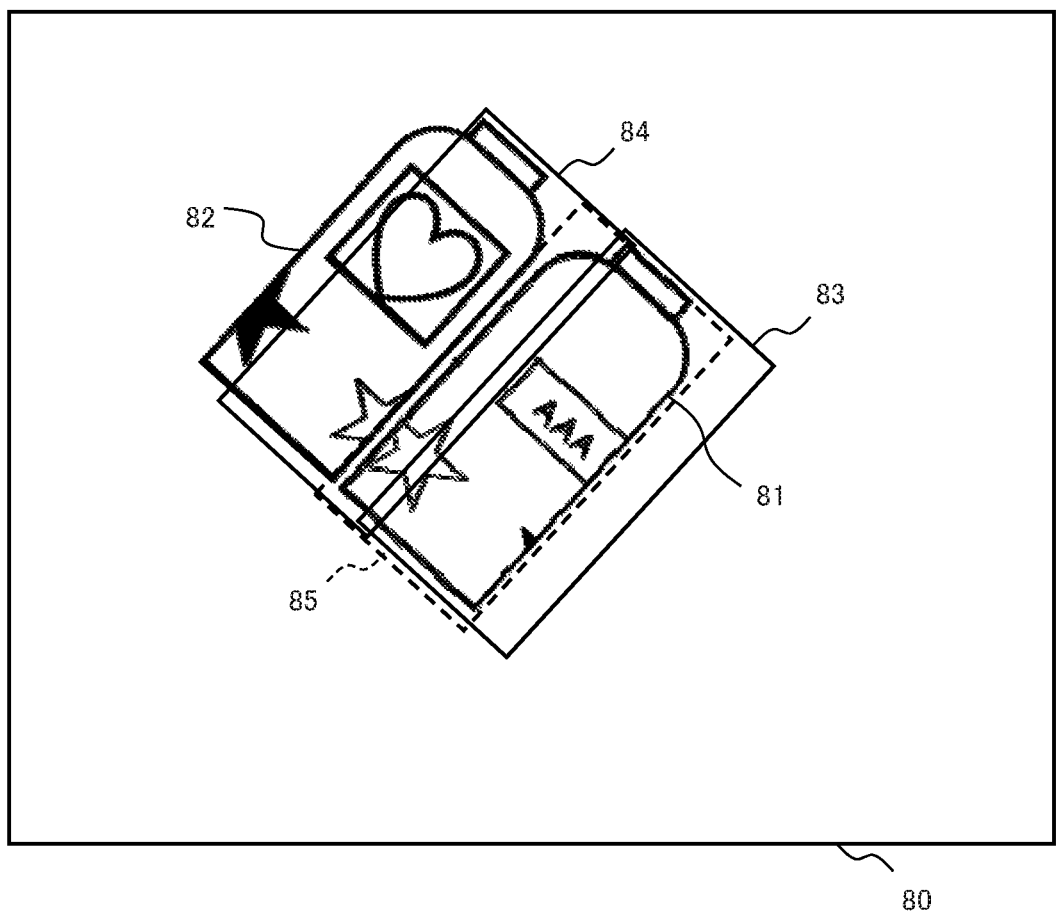
FIG. 8 is a diagram for further illustrating the determination processing performed by the determination unit.
FIG. 9 is a diagram illustrating an example of an output file when an output device is a device outputting received information as a file.

Determination processing performed by the determination unit 130 will be further described with reference to FIG. 4, FIG. 5, FIG. 7, and FIG. 8. FIG. 7 and FIG. 8 are diagrams for illustrating the determination processing performed by the determination unit 130.

A captured image 70 (may also be denoted as Q70) illustrated in FIG. 7 is an image acquired by capturing an image of an article 71. As illustrated in FIG. 7, the captured image 70 includes one article 71. The comparison unit 120 compares such a captured image 70 against a database image 44 by use of feature information extracted from the database image 44 and feature information extracted from the captured image 70. It is assumed that a comparison result indicating that an object represented by the database image 44A and an object represented by the database image 44B that are illustrated in FIG. 4 appear in the captured image 70 is consequently acquired from the acquired comparison result. In other words, it appears from the comparison result as though two objects being the object represented by the database image 44A and the object represented by the database image 44B appear in the captured image 70.

From the comparison result, the determination unit 130 calculates a parameter (a second parameter described above) indicating a geometric relation between the database image 44A and the captured image 70, by use of feature information of the database image 44A and the feature information extracted from the captured image 70 that are used for the comparison by the comparison unit 120. A calculation method of the second parameter may be the same as the method performed by the parameter calculation unit 230. A homography matrix being a second parameter in this case is hereinafter denoted as H[401A→Q70]. Coordinates in a coordinate space of the captured image 70 transformed from coordinates on the database image 44A by use of the homography matrix H[401A→Q70] are referred to as first coordinates P1.

Similarly, the determination unit 130 calculates a homography matrix in a case of transforming coordinates on the database image 44B into coordinates on the captured image 70, by use of feature information of the database image 44B and the feature information extracted from the captured image 70. A homography matrix being a parameter in this case is hereinafter denoted as H[401B→Q70]. Coordinates in the coordinate space on the captured image 70 transformed from coordinates on the database image 44B by use of the homography matrix H[401B→Q70] are referred to as second coordinates P2.

A frame 72 illustrated in FIG. 7 is a region indicated by the first coordinates P1 on the captured image 70, and a frame 73 illustrated in FIG. 7 is a region indicated by the second coordinates P2 on the captured image 70.

Based on the comparison result, the determination unit 130 acquires a parameter 64 associated with "401A" being an image number 42 indicating the database image 44A and "401B" being an image number 42 indicating the database image 44B from the parameter storage unit 240. In this case, the determination unit 130 acquires a parameter 64 in the first row described in FIG. 6 with a transformation source image number 62 "401A" and a transformation destination image number 63 "401B" from the parameter storage unit 240. As described above, the acquired parameter 64 is denoted as H[401A→401B].

Then, the determination unit 130 determines whether or not the plurality of identified objects are the same objects by use of H[401A→Q70], H[401B→Q70], and H[401A→401B].

Specifically, the determination unit 130 transforms coordinates on the database image 44A into coordinates in a coordinate space of the database image 44B by use of H[401A→401B]. Then, the determination unit 130 further transforms the coordinates transformed into the coordinate space of the database image 44B into coordinates in a coordinate space of the captured image 70 by use of H[401B→Q70]. Coordinates after performing the two homography transformations are referred to as third coordinates P3.

A frame 74 in broken lines illustrated in FIG. 7 illustrates an example of a region indicated by the third coordinates P3 on the captured image 70. The region indicated by the frame 74 is a region indicating an estimated position of coordinates on the database image 44A in the coordinate space of the captured image 70, the position being estimated by use of H[401A→401B] and H[401B→Q70].

A comparison between the region indicated by the frame 72 and the region indicated by the frame 74 tells that the regions almost overlap each other. The determination unit 130 calculates an overlap rate being a value indicating a degree of overlap between the frame 72 region and the frame 74 region, and when the overlap rate is equal to or more than a predetermined threshold value, determines that an object included in the frame 72 and an object included in the frame 73 are the same objects. Thus, by using an overlap rate between regions in determination of whether or not objects are the same objects, the determination unit 130 can determine whether or not the objects are the same object with a less amount of calculation.

The determination unit 130 may determine whether or not a plurality of objects are the same objects, based on an overlap rate indicating a ratio between an area of one region and an area of a region included in both of the one region and another region. For example, the determination unit 130 may determine whether or not a plurality of objects are the same objects, based on an overlap rate between an area of the frame 72 region and an area of a region included in both of the frame 72 region and the frame 74 region. Further, the determination unit 130 may determine that a plurality of objects are the same objects, based on an overlap rate between an area of the frame 74 region and the area of the region included in both of the frame 72 region and the frame 74 region. Further, the determination unit 130 may determine that a plurality of objects are the same objects by use of the two overlap rates. Further, without being limited to the above, an overlap rate may be a ratio between the sum of two areas and an area of a region included in both or a ratio between an area of a part included in at least either of two regions and an area of a region included in both.

Further, the determination unit 130 may determine whether a plurality of objects are the same objects by closeness between parameters instead of regions. For example, the determination unit 130 calculates H[401B→Q70]×H[401A→401B] and calculates a degree of similarity between H[401B→Q70]×H[401A→401B] and H[401A→Q70]. The degree of similarity may be any indicator. For example, the degree of similarity may be closeness between values in matrices or closeness between values based on any indicator derived based on a matrix. Then, when the degree of similarity satisfies a predetermined condition, such as the degree of similarity being equal to or more than a predetermined threshold value, the determination unit 130 may determine that the plurality of objects are the same objects.

Thus, by using a degree of similarity between matrices in determination of whether or not objects are the same objects, the object identification device 100 can more accurately determine whether or not the objects are the same objects compared with a case of using an overlap rate between regions. When determining a degree of similarity, the determination unit 130 may calculate, after acquiring a parameter 64 between database images 44, based on a comparison result, a second parameter being the same type as the parameters 64.

Further, the determination unit 130 may determine whether or not a plurality of objects are the same objects by use of a feature point instead of all coordinates on a database image 44. For example, the determination unit 130 may determine that a plurality of objects are the same objects when a distance between coordinates of a feature point transformed by use of H[401A→401B] and H[401B→Q70], and coordinates of the feature point transformed by use of H[401A→Q70] is equal to or less than a predetermined threshold value.

Further, the determination unit 130 may determine whether or not a plurality of identified objects are the same objects by use of H[401A→Q70], H[401B→Q70], and H[401B→401A] in place of or in addition to the aforementioned determination.

A captured image 80 (also referred to as Q80) illustrated in FIG. 8 is an image acquired by capturing an image of an article 81 and an article 82. As illustrated in FIG. 8, the captured image 80 includes two articles being the article 81 and the article 82. The comparison unit 120 compares such a captured image 80 against a database image 44 by use of feature information extracted from the database image 44 and feature information extracted from the captured image 80.

A method of determining that the article 81 and the article 82 are the same objects when the articles are identified as a plurality of articles is similar to the case described by use of FIG. 7. A method of correctly identifying that the two articles are different objects will be described.

For example, it is assumed that a comparison result includes information indicating that an object represented by the database image 44A and an object represented by the database image 44C appear in the captured image 80.

Based on such a comparison result, the determination unit 130 calculates H[401A→Q80] being a homography matrix in a case of transforming coordinates on the database image 44A into coordinates on the captured image 80 from feature information included in the database image 44A and related feature information on the captured image 80. Coordinates in a coordinate space of the captured image 80 transformed from coordinates on the database image 44A by use of the homography matrix H[401A→Q80] are referred to as fourth coordinates P4.

Similarly, the determination unit 130 calculates H[401C→Q80] being a homography matrix in a case of transforming coordinates on the database image 44C into coordinates on the captured image 80 from feature information included in the database image 44C and related feature information on the captured image 80. Coordinates in the coordinate space of the captured image 80 transformed from coordinates on the database image 44C by use of the homography matrix H[401C→Q80] are referred to as fifth coordinates P5.

A frame 83 illustrated in FIG. 8 is a region indicated by the fourth coordinates P4 on the captured image 80, and a frame 84 illustrated in FIG. 8 is a region indicated by the fifth coordinates P5 on the captured image 80.

Based on the comparison result, the determination unit 130 acquires a parameter 64 associated with "401A" being an image number 42 indicating the database image 44A and "401C" being an image number 42 indicating the database image 44C from the parameter storage unit 240. In this case, the determination unit 130 acquires a parameter 64 in the second row described in FIG. 6 with a transformation source image number 62 "401A" and a transformation destination image number 63 "401C" from the parameter storage unit 240. The acquired parameter 64 is expressed as H[401A→401C].

Then, the determination unit 130 transforms coordinates on the database image 44A into coordinates in a coordinate space of the database image 44C by use of H[401A→401C]. Then, the determination unit 130 further transforms the coordinates transformed into the coordinate space of the database image 44C into coordinates in the coordinate space of the captured image 80 by use of H[401C→Q80]. Coordinates after performing the two homography transformations are referred to as sixth coordinates P6.

A frame 85 in broken lines illustrated in FIG. 8 illustrates an example of a region indicated by the sixth coordinates P6 on the captured image 80. The region indicated by the frame 85 is a region indicating an estimated position of coordinates of the database image 44A in the coordinate space of the captured image 80 with respect to the article 82, the position being estimated by use of H[401A→401C] and H[401C→Q80].

A comparison between the region indicated by the frame 83 and the region indicated by the frame 85 indicates a greater non-overlapping portion compared with the region indicated by the frame 72 and the region indicated by the frame 74 in FIG. 7. Consequently, the determination unit 130 determines that the object represented by the database image 44C related to the information used for calculation of the frame 85 and the object represented by the database image 44A related to the frame 83 are different objects. Consequently, the determination unit 130 can determine that there are two objects included in FIG. 8.

Thus, the object identification device 100 according to the present example embodiment can correctly determine that objects arranged side by side are different objects.

The determination unit 130 supplies a determination result thus indicating whether or not the plurality of identified objects are the same objects to the output control unit 140.

Based on a determination result supplied from the determination unit 130, the output control unit 140 controls output of information indicating the determination result. For example, when the output device 400 is a display device such as a display (display unit) or a terminal device including a display, the output control unit 140 outputs a control signal for displaying information indicating the determination result on a screen to the output device 400. Consequently, the output device 400 displays the information indicating the determination result on the screen.

Further, when the output device 400 is a device outputting received information as a file, the output control unit 140 outputs, to the output device 400, a control signal for outputting the information indicating the determination result as a file. Consequently, the output device 400 outputs the information indicating the determination result as a file.

FIG. 9 is a diagram illustrating an example of an output file when the output device 400 is a device outputting received information as a file. An output file 91 illustrated in FIG. 9 is tabular data including a column for an article name 92 and a column for a quantity 93. The output control unit 140 may generate a control signal for controlling the output device 400 in such a way as to output such an output file 91. Consequently, an operator 2 can readily grasp which object is included in a captured image in what quantity. Further, for example, the output control unit 140 may compare a list of objects to be included in a captured image with a determination result and perform control in such a way as to display the comparison result on the output device 400.

Figure 10:
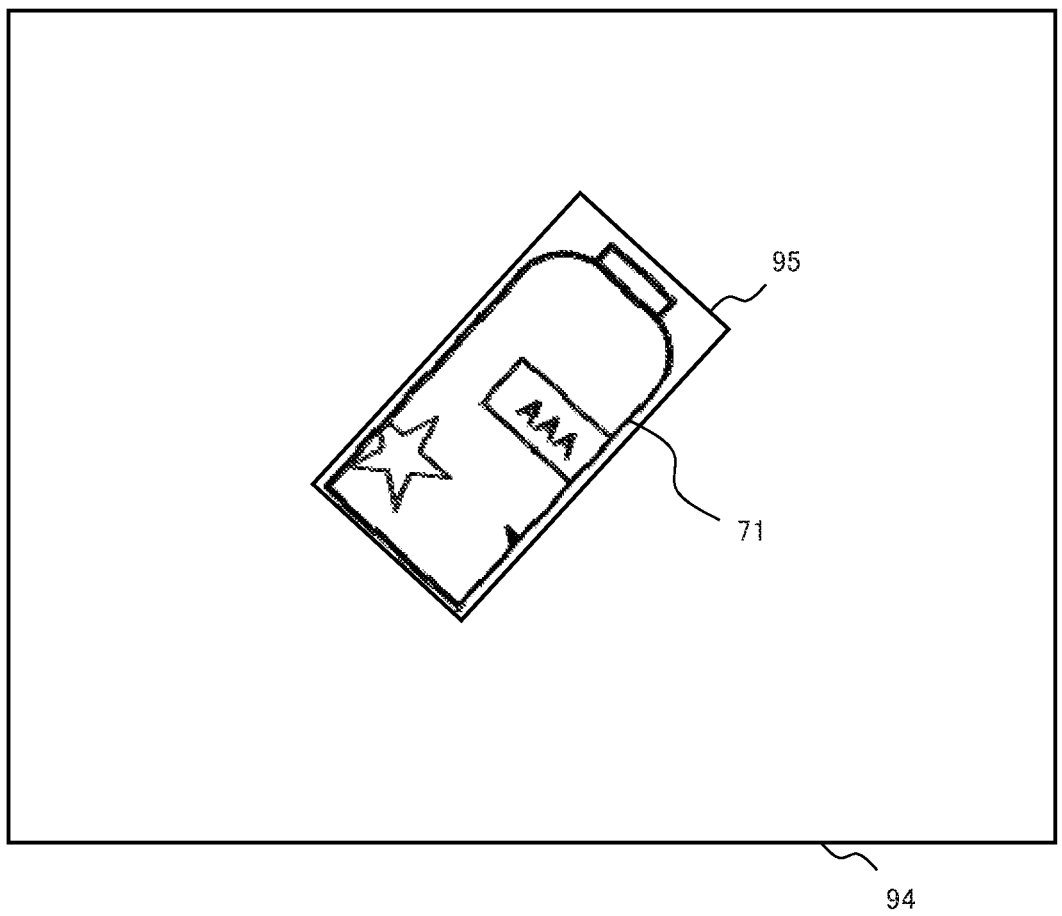
FIG. 10 is a diagram illustrating an example of a screen output by the output device when the output device is a display device or a terminal device including a display.

FIG. 10 is a diagram illustrating an example of a display screen output by the output device 400 when the output device 400 is a display device or a terminal device including a display.

The output control unit 140 generates a control signal for causing a display unit such as a display to display a display screen in which positional information indicating a position of an identified object on a captured image is superimposed on the captured image. Based on the control signal generated by the output control unit 140, the output device 400 displays, on the display unit, a display screen in which the positional information is superimposed on the captured image.

A display screen 94 illustrated in FIG. 10 is a screen displaying the captured image 70 including the article 71 illustrated in FIG. 7 on the display unit. The output control unit 140 generates a display screen in which positional information indicating a position of an identified object on a captured image is superimposed on the captured image 70. The output control unit 140 may set, as positional information, information indicating a region with the highest similarity score between feature points, out of regions on a captured image 70 matching any of database images 44 at a comparison by the comparison unit 120.

Further, the output control unit 140 may set, as positional information, information indicating a region related to a database image 44 determined to match a captured image 70 at a comparison by the comparison unit 120 when the database image 44 is transformed into coordinates in a coordinate space of the captured image 70. For example, the output control unit 140 may set, as positional information, information indicating either of the region indicated by the frame 72 and a region indicated by the frame 73 that are illustrated in FIG. 7. Further, the output control unit 140 may set, as positional information, information indicating a region with the highest similarity score between feature points out of the region indicated by the frame 72 and the region indicated by the frame 73 that are illustrated in FIG. 7.

Further, from the frame 72 and the frame 73 indicating positions of database images 44 on a captured image 70 that are calculated by use of H[401A→Q70] and H[401B→Q70]

being parameters related to objects determined to be the same object, the output control unit 140 may estimate a position of the object. For example, the output control unit 140 may estimate the position of the object by determining an average value of coordinates by use of coordinates calculated by use of H[401A→Q70] and coordinates calculated by use of H[401B→Q70]. Then, the output control unit 140 may generate a display screen in which information indicating the estimated position (region) is superimposed and displayed on the captured image 70. A frame 95 illustrated in FIG. 10 indicates the estimated position. Thus, by causing the output device 400 to display a display screen in which information indicating positions of objects is superimposed on a captured image 70 by the output control unit 140, the object identification device 100 can, for example, allow an operator 2 viewing the display screen to readily grasp a number and a position of the objects.

Figure 11:
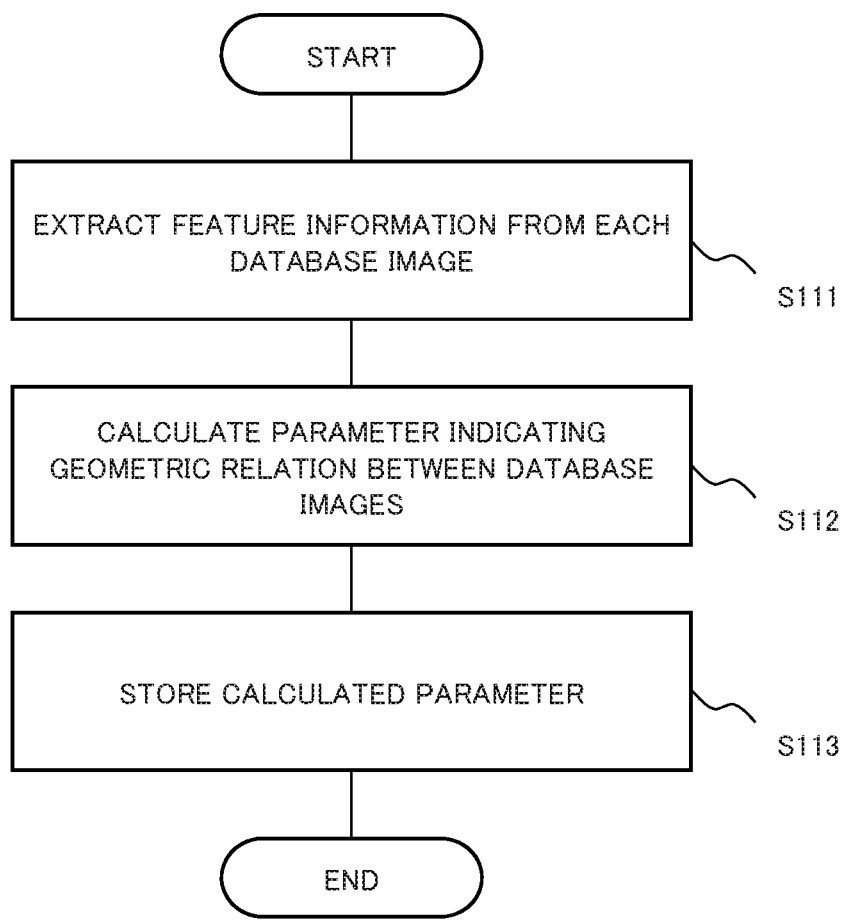
FIG. 11 is a flowchart illustrating an example of a processing flow in the calculation device.

FIG. 11 is a flowchart illustrating an example of a processing flow in the calculation device 200 in the system 1 according to the present example embodiment. As described in FIG. 11, the second feature extraction unit 220 extracts feature information from each database image 44 stored in the image storage unit 210 (Step S111).

Then, based on the extracted feature information, the parameter calculation unit 230 calculates a parameter indicating a geometric relation between database images 44 (Step S112).

As described above, when a plurality of objects are identified in a captured image by a comparison using a database image 44, a parameter is used along with a second parameter when determining whether or not the plurality of objects are the same objects, the second parameter indicating a geometric relation between the database image 44 and the captured image.

Subsequently, the parameter calculation unit 230 stores the calculated parameter into the parameter storage unit 240 (Step S113).

Figure 12:
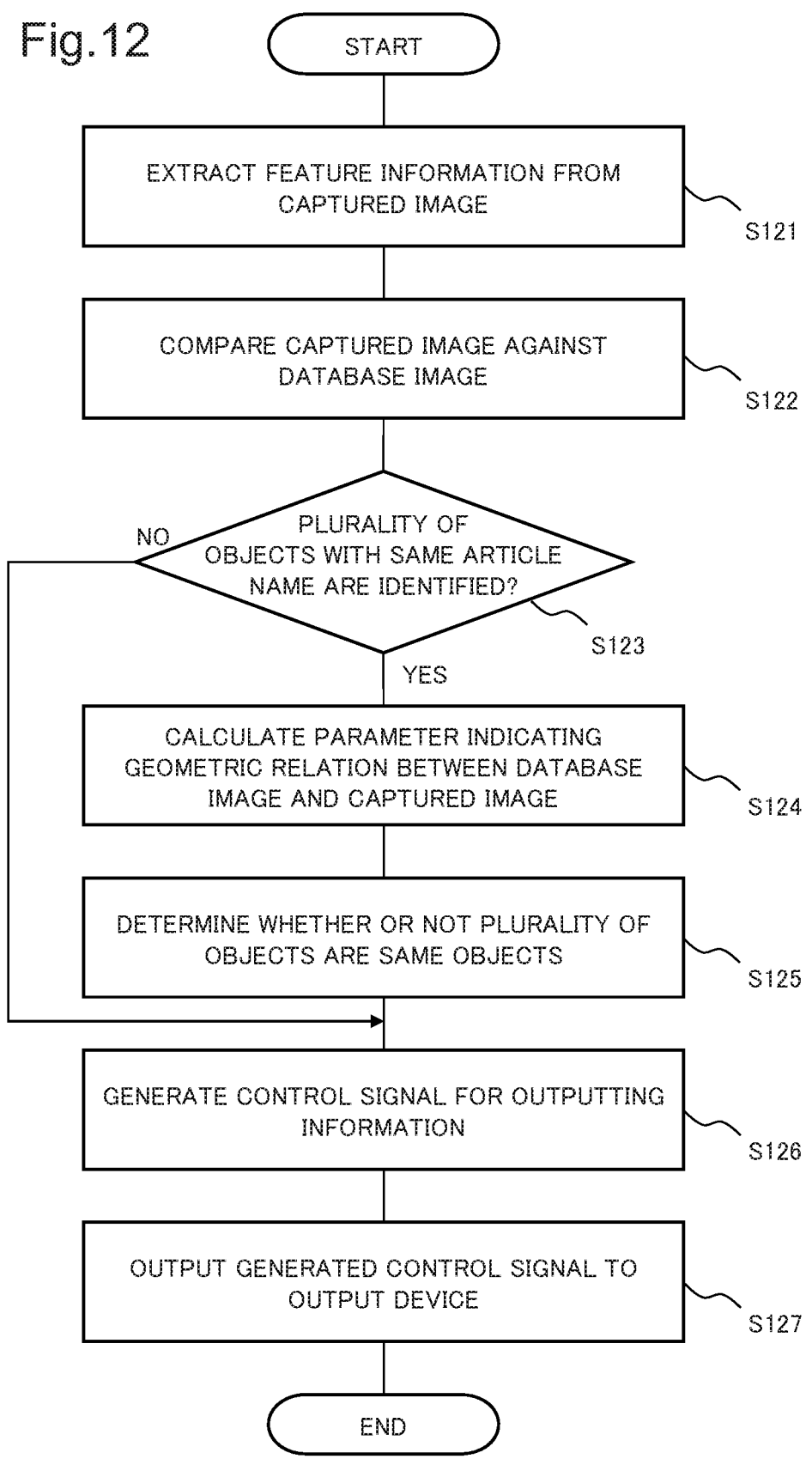
FIG. 12 is a flowchart illustrating an example of a processing flow in the object identification device.

FIG. 12 is a flowchart illustrating an example of a processing flow in the object identification device 100 in the system 1 according to the present example embodiment. As described in FIG. 12, the first feature extraction unit 110 in the object identification device 100 extracts feature information from an acquired captured image (Step S121).

Then, by use of the feature information extracted from the captured image and the feature information extracted from the database image 44 in Step S111, the comparison unit 120 compares the captured image against the database image 44 (Step S122).

The determination unit 130 refers to the comparison result and determines whether or not a plurality of objects are identified and also the identified objects indicate the same article name (Step S123). When a plurality of objects with the same article name are not identified (NO in Step S123), the processing proceeds to Step S126.

When a plurality of objects with the same article name are identified (YES in Step S123), the determination unit 130 calculates a parameter indicating a geometric relation between a database image 44 related to the identified object (matching the captured image) and the captured image (Step S124).

Then, by use of the parameter calculated in Step S112 and the parameter calculated in Step S124, whether or not the plurality of objects are the same objects is determined (Step S125).

Subsequently, the output control unit 140 generates a control signal for controlling output of information by the output device 400 (Step S126). In a case of after execution of Step S125, the output control unit 140 generates a control signal for outputting information indicating the determination result, based on the determination result. Then, the output control unit 140 outputs the generated control signal to the output device 400 (Step S127).

Consequently, based on the control signal output by the output control unit 140, the output device 400 can display, for example, the display screen 94 as illustrated in FIG. 10 on a display unit.

As described above, the comparison unit 120 in the object identification device 100 in the system 1 according to the present example embodiment compares a captured image against a plurality of database images for identifying objects. When a plurality of objects are included in the captured image as a result of comparing, the determination unit 130 determines whether or not the plurality of objects are the same objects, based on a parameter indicating a geometric relation between database images and a parameter indicating a geometric relation between a database image related to each identified object and the captured image.

For example, when a comparison result indicating that a captured image is related to a plurality of database images is acquired in a case of the captured image actually including one object, a plurality of objects are assumed to be included in the captured image from the comparison result. According to the present example embodiment, based on the comparison result, the determination unit 130 determines whether or not the plurality of identified objects are the same objects, based on a parameter indicating a geometric relation between database images and a plurality of parameters each of which indicating a geometric relation between the captured image and each of the plurality of aforementioned database images, and therefore positions where a database image and another related database image are related on the captured image can be calculated. Consequently, the object identification device 100 can determine whether or not an object included in a captured image is one object matching a database image and another database image.

Accordingly, even when one object is associated with a plurality of database images, the object identification device 100 according to the present example embodiment can accurately determine that a number of the object is one.

Accordingly, the object identification device 100 according to the present example embodiment precisely identifies a number of objects to be identified.

In the system 1 according to the present example embodiment, the image capture device 300 may be integrally formed with the object identification device 100 and may function as, for example, an intelligence camera. Further, part of the functions of the calculation device 200 may be built into the object identification device 100. For example, the first feature extraction unit 110 and the second feature extraction unit 220 may be provided by the same circuit.

Thus, the devices in the system 1 illustrated in FIG. 1 may be configured in combination.

Second Example Embodiment

A second example embodiment of the present disclosure will be described. A basic configuration according to the present example embodiment resolving the problem to be resolved by the present disclosure will be described.

Figure 13:
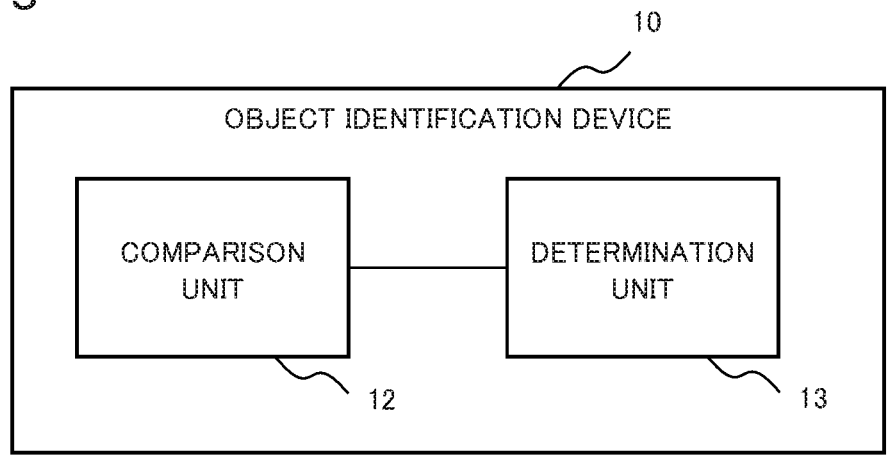
FIG. 13 is a functional block diagram illustrating an example of a functional configuration of an object identification device according to a second example embodiment.

FIG. 13 is a functional block diagram illustrating an example of a functional configuration of an object identification device 10 according to the present example embodiment. As illustrated in FIG. 13, the object identification device 10 according to the present example embodiment includes a comparison unit 12 and a determination unit 13.

The comparison unit 12 has the function of the aforementioned comparison unit 120. The comparison unit 12 compares a captured image against a plurality of images for identification for identifying objects. The comparison unit 12 supplies the comparison result to the determination unit 13. A method of comparing performed by the comparison unit 12 is not particularly limited, and a method similar to that by the aforementioned comparison unit 120 may be employed.

The determination unit 13 has the function of the aforementioned determination unit 130. When a comparison result indicates that a plurality of objects are included in a captured image, the determination unit 13 determines whether or not the plurality of objects are the same objects, based on a first parameter indicating a geometric relation between images for identification and a second parameter indicating a geometric relation between an image for identification related to each identified object and the captured image. Similarly to the aforementioned determination unit 130, the determination unit 13 may determine whether or not a plurality of objects are the same objects, based on an overlap rate indicating a degree of overlap between (1) a region in an image for identification on a coordinate space of a captured image, the region being acquired by transforming coordinates on the image for identification into coordinates in the coordinate space of the captured image by use of a first parameter and a second parameter, and (2) a region in another image for identification on the coordinate space of the captured image, the region being acquired by transforming coordinates on the other image for identification into coordinates in the coordinate space of the captured image by use of the second parameter.

Figure 14:
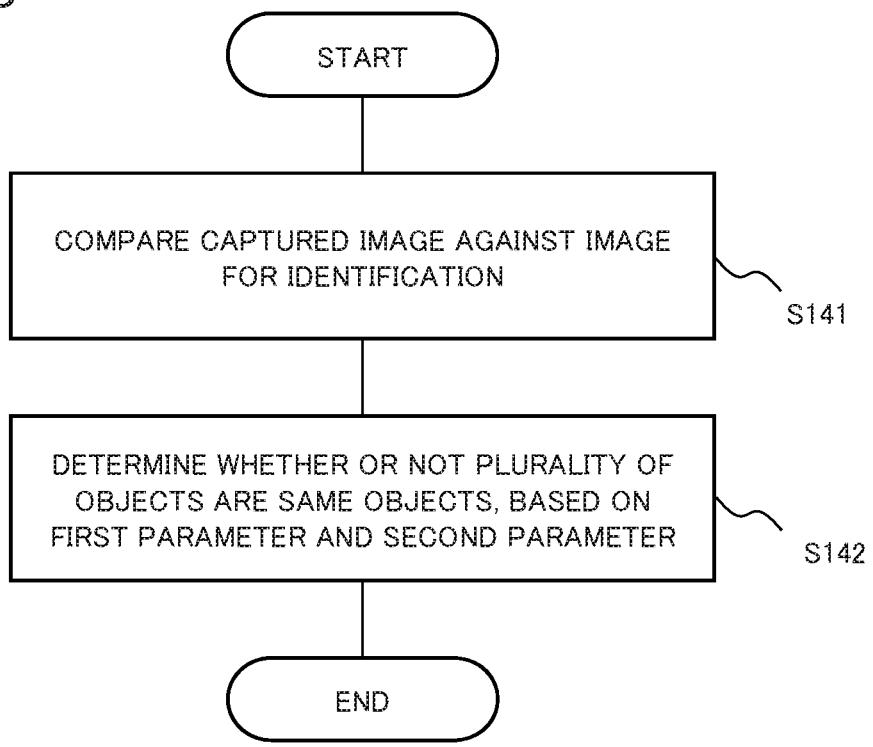
FIG. 14 is a flowchart illustrating an example of a processing flow in the object identification device according to the second example embodiment.

FIG. 14 is a flowchart illustrating an example of a processing flow in the object identification device 10 according to the present example embodiment. As illustrated in FIG. 14, the comparison unit 12 compares a captured image against a plurality of images for identification for identifying objects (Step S141). Then, the determination unit 13 determines whether or not a plurality of objects are the same objects, based on a first parameter and a second parameter (Step S142).

Figure 15:
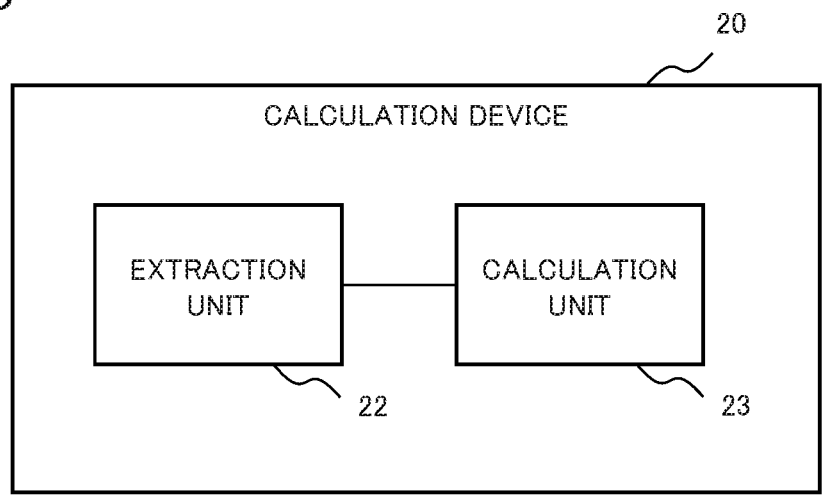
FIG. 15 is a functional block diagram illustrating an example of a functional configuration of a calculation device calculating a first parameter referred to by the object identification device, according to the second example embodiment.

FIG. 15 is a functional block diagram illustrating an example of a functional configuration of a calculation device 20 calculating a first parameter referred to by the aforementioned object identification device 10. As illustrated in FIG. 15, the calculation device 20 includes an extraction unit 22 and a calculation unit 23.

The extraction unit 22 has the function of the aforementioned second feature extraction unit 220. The extraction unit 22 extracts feature information indicating a feature of an object from each of a plurality of images for identification for identifying objects. The extraction unit 22 supplies the extracted feature information to the calculation unit 23.

The calculation unit 23 has the function of the aforementioned parameter calculation unit 230. The calculation unit 23 calculates a first parameter indicating a geometric relation between a plurality of images for identification, based on extracted feature information. As described above, when a plurality of objects are identified in a captured image by a comparison by the object identification device 10 using an image for identification, a first parameter is used along with a second parameter when determining whether or not the plurality of objects are the same objects, the second parameter indicating a geometric relation between an image for identification related to each identified object and the captured image.

Figure 16:
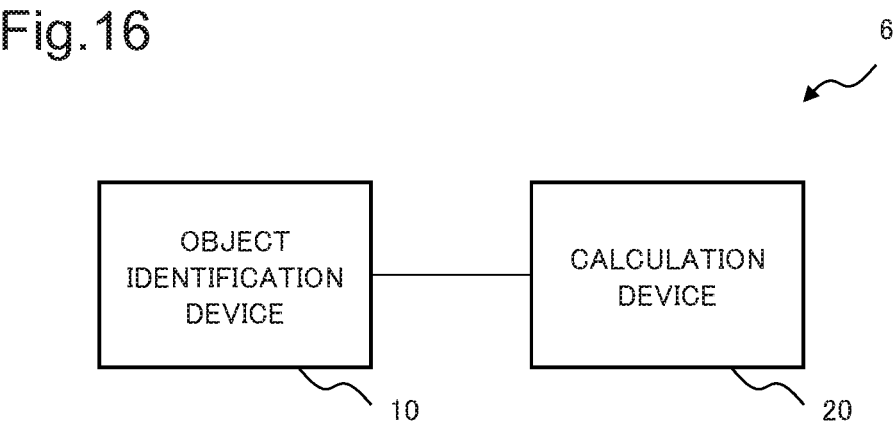
FIG. 16 is a block diagram illustrating a configuration example of a system including the object identification device and the calculation device, according to the second example embodiment.

Further, the object identification device 10 and the calculation device 20, according to the present example embodiment, may be configured as a system 6 illustrated in FIG. 16. FIG. 16 is a block diagram illustrating a configuration example of a system including the object identification device 10 and the calculation device 20. As illustrated in FIG. 16, the system 6 includes the object identification device 10 and the calculation device 20. The object identification device 10 and the calculation device 20 are communicably connected to each other.

The object identification device 10 may be integrally formed with the calculation device 20, or part of the functions of the calculation device 20 may be built into the object identification device 10. Further, the system 6 may be configured to include an image capture device 300 and an output device 400, similarly to the aforementioned system 1.

For example, when a comparison result indicating that a captured image is related to a plurality of images for identification is acquired in a case of the captured image actually including one object, a plurality of objects are identified to be included in the captured image from the comparison result. According to the present example embodiment, based on the comparison result, the determination unit 13 determines whether or not the plurality of identified objects are the same objects, based on a first parameter and a plurality of second parameters, and therefore can calculate at which positions an image for identification and another related image for identification are included on the captured image. Consequently, the object identification device 10 can determine whether or not an object included in a captured image is one object matching an image for identification and another image for identification.

Accordingly, even when one object is associated with a plurality of images for identification, the object identification device 10 according to the present example embodiment can accurately determine that a number of the object is one.

Accordingly, the object identification device 10 according to the present example embodiment precisely identifies a number of objects to be identified.

Hardware Configuration

Figure 17:
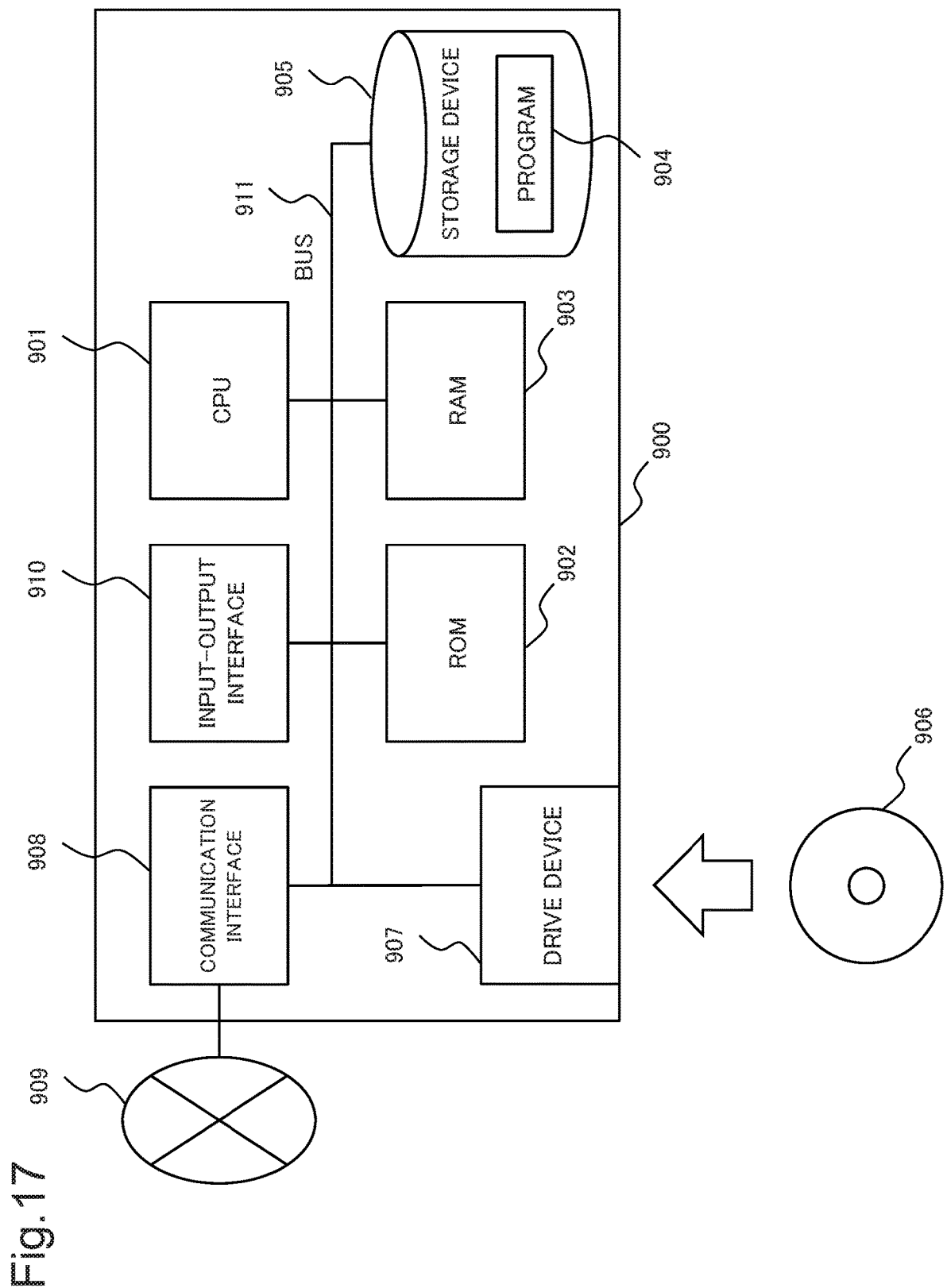
FIG. 17 is a diagram exemplarily illustrating a hardware configuration of a computer (information processing device) capable of providing each example embodiment.

Each component in each device according to each example embodiment of the present disclosure represents a function-based block. For example, a part or the whole of each component in each device is provided by any combination of an information processing device 900 as illustrated in FIG. 17 and a program. FIG. 17 is a block diagram illustrating an example of a hardware configuration of the information processing device 900 providing each component in each device. As an example, the information processing device 900 includes the following components.

A central processing unit (CPU) 901

A read only memory (ROM) 902

A random access memory (RAM) 903

A program 904 loaded on the RAM 903

A storage device 905 storing the program 904

A drive device 907 performing a read and a write of a recording medium 906

A communication interface 908 connected to a communication network 909

An input-output interface 910 performing input and output of data

A bus 911 connecting the components

Each component in each device according to each example embodiment is provided by the CPU 901 acquiring and executing the program 904 providing the function of the component. For example, the program 904 providing the function of each component in each device is previously stored in the storage device 905 or the ROM 902, and is loaded into the RAM 903 and executed by the CPU 901, as needed. The program 904 may be supplied to the CPU 901 through the communication network 909 or may be previously stored in the recording medium 906, and the drive device 907 may read the program and supply the program to the CPU 901.

There are various modified examples of the method of providing each device. For example, each device may be provided by any combination of a separate information processing device 900 and a program, for each component. Further, a plurality of components included in each device may be provided by any combination of one information processing device 900 and a program.

Further, a part or the whole of each component in each device is provided by another general-purpose or dedicated circuit, a processor or the like, or a combination thereof. The above may be configured with a single chip or may be configured with a plurality of chips connected through a bus.

A part or the whole of each component in each device may be provided by a combination of the aforementioned circuit or the like and a program.

When a part or the whole of each component in each device is provided by a plurality of information processing devices, circuits, or the like, the plurality of information processing devices, circuits, or the like may be placed in a concentrated manner or in a distributed manner. For example, the information processing devices, the circuits, or the like may be provided in a form of being connected to one another through a communication network, such as a client-server system or a cloud computing system.

The respective aforementioned example embodiments are preferred example embodiments of the present disclosure, and the scope of the present disclosure is not limited to the respective aforementioned example embodiments; and a person skilled in the art can make example embodiments which include various changes through modifying and substituting the respective aforementioned example embodiments without departing from the spirit and scope of the present disclosure.

For example, the object identification device (10, 100) according to the present disclosure may be suitably used in a system including a camera installed in the neighborhood of a cash register such as a point of sales (POS) register. In this case, the aforementioned object identification device (10, 100) may be provided by being built into the POS register. The POS register may further have the function of the calculation device (20, 200). Further, the object identification device (10, 100) may cause the POS register to perform output similarly to the output device 400. Even in this case, by determining whether or not a plurality of recognized objects are the same objects from a captured image acquired by capturing an image of a commodity by the camera, the object identification device (10, 100) precisely identifies a number of the objects to be identified.

Further, the object identification device (10, 100) and the calculation device (20, 200), according to the present disclosure, may be provided by a server device capable of communicating with the POS register. Then, the object identification device (10, 100) may cause the POS register to perform output similarly to the output device 400. Thus, the object identification device (10, 100) and the calculation device (20, 200), according to the present disclosure may also be suitably applied to a configuration using a POS register already installed at a store.

The aforementioned POS register is not limited to a cash register operated by a clerk and may be either of a sharing-type cash register (semi-self-register) at which a customer performs a checkout and a cash register (self-register) at which a clerk is not involved when passing through the register (a series of operations up to a checkout is performed only by a customer).

A part or the whole of the aforementioned example embodiments may also be described as the following supplementary notes but are not limited thereto.

(Supplementary Note 1)

An object identification device includes:
comparison unit that compares a captured image against a plurality of images for identification for identifying objects; and
determination unit that, when the comparison result indicates that a plurality of objects are included in the captured image, determines whether or not the plurality of objects are the same objects, based on a first parameter indicating a geometric relation between the images for identification and a second parameter indicating a geometric relation between the image for identification related to each identified object and the captured image.

(Supplementary Note 2)

The object identification device according to supplementary note 1, wherein
the determination unit,
based on the comparison result, calculates, as the second parameter, a third parameter indicating a geometric relation when coordinates on a first image for identification being an image for identification related to an identified first object are transformed onto the captured image, and a fourth parameter indicating a geometric relation when coordinates on a second image for identification being an image for identification related to an identified second object different from the first object are transformed onto the captured image, and
determines whether or not the plurality of objects are the same objects by use of a value acquired from the first parameter when coordinates on the first image for identification are transformed onto the second image for identification and the fourth parameter, and the third parameter.

(Supplementary Note 3)

The object identification device according to supplementary note 2, wherein
the determination unit determines that the plurality of objects are the same objects when an overlap rate indicating a degree of overlap between a first region on the captured image of the first object, the first region being estimated from the first parameter and the fourth parameter, and a second region on the captured image of the first object, the second region being acquired from the third parameter, is equal to or more than a predetermined threshold value.

(Supplementary Note 4)

The object identification device according to supplementary note 2, wherein
the determination unit determines that the plurality of objects are the same objects when a degree of similarity based on a predetermined indicator between the value acquired from the first parameter when coordinates on the first image for identification are transformed onto the second image for identification and the fourth parameter, and the third parameter satisfies a predetermined condition.

(Supplementary Note 5)

The object identification device according to any one of supplementary note 1 to 4, further comprising output control unit that controls output of information indicating a determination result by the determination unit, wherein the output control unit performs control in such a way as to cause a display unit to display a display screen in which positional information indicating a position of the identified object on the captured image is superimposed on the captured image.

(Supplementary Note 6)

The object identification device according to supplementary note 5, wherein, by use of the second parameter related to an object determined to be the same object, the output control unit estimates a position of the object from a position of each of a plurality of the images for identification on the captured image and sets information indicating the estimated position as the positional information.

(Supplementary Note 7)

An object identification method comprising:

comparing a captured image against a plurality of images for identification for identifying objects; and, when the comparison result indicates that a plurality of objects are included in the captured image, determining whether or not the plurality of objects are same objects, based on a first parameter indicating a geometric relation between the images for identification and a second parameter indicating a geometric relation between the image for identification related to each identified object and the captured image.

(Supplementary Note 8)

The object identification method according to supplementary note 7, further comprising:

based on the comparison result, calculating, as the second parameter, a third parameter indicating a geometric relation when coordinates on a first image for identification being an image for identification related to an identified first object are transformed onto the captured image and a fourth parameter indicating a geometric relation when coordinates on a second image for identification being an image for identification related to an identified second object different from the first object are transformed onto the captured image; and determining whether or not the plurality of objects are the same objects by use of a value acquired from the first parameter when coordinates on the first image for identification are transformed onto the second image for identification and the fourth parameter, and the third parameter.

(Supplementary Note 9)

A computer readable non-transitory recording medium having a program recorded thereon, the program causing a computer to execute:

processing of comparing a captured image against a plurality of images for identification for identifying objects; and processing of, when the comparison result indicates that a plurality of objects are included in the captured image, determining whether or not the plurality of objects are same objects, based on a first parameter indicating a geometric relation between the images for identification and a second parameter indicating a geometric relation between the image for identification related to each identified object and the captured image.

(Supplementary Note 10)

The recording medium according to supplementary note 9, wherein the determination processing, based on the comparison result, calculates, as the second parameter, a third parameter indicating a geometric relation when coordinates on a first image for identification being an image for identification related to an identified first object are transformed onto the captured image and a fourth parameter indicating a geometric relation when coordinates on a second image for identification being an image for identification related to an identified second object different from the first object are transformed onto the captured image, and determines whether or not the plurality of objects are the same objects by use of a value acquired from the first parameter when coordinates on the first image for identification are transformed onto the second image for identification and the fourth parameter, and the third parameter.

(Supplementary Note 11)

A calculation device comprising:

extraction unit that extracts, from each of a plurality of images for identification for identifying objects, feature information indicating a feature of the object; and calculation unit that, when a plurality of objects are identified in a captured image by a comparison using the image for identification, calculates a first parameter used along with a second parameter when determining whether or not the plurality of objects are same objects, based on the extracted feature information, the first parameter indicating a geometric relation between the plurality of images for identification, and the second parameter indicating a geometric relation between the image for identification related to each identified object and the captured image.

(Supplementary Note 12)

A system comprising:

the object identification device according to any one of supplementary note 1 to 6; and the calculation device according to supplementary note 11.

REFERENCE SIGNS LIST

1 System
6 System
10 Object identification device
12 Comparison unit
13 Determination unit
20 Calculation device
22 Extraction unit
23 Calculation unit
100 Object identification device
110 First feature extraction unit
120 Comparison unit
130 Determination unit
140 Output control unit
200 Calculation device
210 Image storage unit
220 Second feature extraction unit 230 Parameter calculation unit
240 Parameter storage unit
300 Image capture device
400 Output device

The invention claimed is:

1. An object identification device comprising:
at least one memory configured to store instructions; and
at least one processor configured to execute the instructions to:
    compare a captured image against a plurality of identification images for identifying objects; and
    determine, whether or not a plurality of objects indicated to be included in the captured image in a result of the comparison is a single object, based on
        a first parameter indicating a geometric relation between a first identification image related to an identified first object and a second identification image related to an identified second object different from the first object and
        a second parameter indicating a geometric relation between the identification image related to each identified object and the captured image, the second parameter including, a third parameter indicating a geometric relation between the first identification image and the captured image, and a fourth parameter indicating a geometric relation between the second identification image and the captured image.

2. The object identification device according to claim 1, wherein the processor is configured to execute the instructions to:
    calculate the third parameter indicating the geometric relation to transform coordinates on the first identification image onto the captured image, and the fourth parameter indicating the geometric relation to transform coordinates on the second identification image onto the captured image, and
    determine whether or not the plurality of objects is a single object based on a value acquired from the first parameter that transforms coordinates on the first identification image onto the second identification image and the fourth parameter, and the third parameter.

3. The object identification device according to claim 2, wherein the processor is configured to execute the instructions to:
    determine that the plurality of objects is a single object when an overlap rate indicating a degree of overlap between a first region on the captured image of the first object, the first region being estimated from the first parameter and the fourth parameter, and a second region on the captured image of the first object, the second region being acquired from the third parameter, is equal to or more than a predetermined threshold value.

4. The object identification device according to claim 3 wherein the processor is configured to execute the instructions to:
    control output of information indicating a determination result, wherein
    the output is controlled in such a way as to cause a display unit to display a display screen in which positional information indicating a position of the identified object on the captured image is superimposed on the captured image.

5. The object identification device according to claim 2, wherein the processor is configured to execute the instructions to:
    determine that the plurality of objects is a single object when a degree of similarity based on a predetermined indicator between the value acquired from the first parameter that transforms coordinates on the first identification image onto the second identification image and the fourth parameter, and the third parameter satisfies a predetermined condition.

6. The object identification device according to claim 5 wherein the processor is configured to execute the instructions to:
    control output of information indicating a determination result, wherein
    the output is controlled in such a way as to cause a display unit to display a display screen in which positional information indicating a position of the identified object on the captured image is superimposed on the captured image.

7. The object identification device according to claim 2 wherein the processor is configured to execute the instructions to:
    control output of information indicating a determination result, wherein
    the output is controlled in such a way as to cause a display unit to display a display screen in which positional information indicating a position of the identified object on the captured image is superimposed on the captured image.

8. The object identification device according to claim 1, wherein the processor is configured to execute the instructions to:
    control output of information indicating a determination result, wherein
    the output is controlled in such a way as to cause a display unit to display a display screen in which positional information indicating a position of the identified object on the captured image is superimposed on the captured image.

9. The object identification device according to claim 8, wherein the processor is configured to execute the instructions to:
    by use of the second parameter related to an object determined to be the single object, estimate a position of the object from a position of each of a plurality of the identification images on the captured image and set information indicating the position estimated as the positional information.

10. An object identification method comprising:
comparing a captured image against a plurality of identification images for identifying objects; and,
determining whether or not a plurality of objects indicated to be included in the captured image in a result of the comparison is a single object, based on
    a first parameter indicating a geometric relation between a first identification image related to an identified first object and a second identification image related to an identified second object different from the first object and
    a second parameter indicating a geometric relation between the identification image related to each identified object and the captured image, the second parameter including a third parameter indicating a geometric relation between the first identification image and the captured image and a fourth parameter indicating a geometric relation between the second identification image and the captured image.

11. The object identification method according to claim 10, further comprising:
   calculating, the third parameter indicating the geometric relation to transform coordinates on the first identification image onto the captured image and the fourth parameter indicating the geometric relation to transform coordinates on a second identification image onto the captured image; and
   determining whether or not the plurality of objects is a single object based on a value acquired from the first parameter that transforms coordinates on the first identification image onto the second identification image and the fourth parameter, and the third parameter.

12. A computer readable non-transitory recording medium having a program recorded thereon, the program causing a computer to execute:
   processing of comparing a captured image against a plurality of identification images for identifying objects; and
   processing of determining whether or not a plurality of objects indicated to be included in the captured image in a result of the comparison is a single object, based on
      a first parameter indicating a geometric relation between a first identification image related to an identified first object and a second identification image related to an identified second object different from the first object and
      a second parameter indicating a geometric relation between the identification image related to each identified object and the captured image, the second parameter including a third parameter indicating a geometric relation between the first identification image and the captured image, and a fourth parameter indicating a geometric relation between the second identification image and the captured image.

13. The recording medium according to claim 12, wherein the program causing the computer to execute
   processing of calculating the third parameter indicating the geometric relation to transform coordinates on the first identification image onto the captured image and the fourth parameter indicating the geometric relation to transform coordinates on a second identification image onto the captured image, and
   processing of determining whether or not the plurality of objects is a single object based on a value acquired from the first parameter that transforms coordinates on the first identification image onto the second identification image and the fourth parameter, and the third parameter.

* * * * *